(12) United States Patent
Saberton

(10) Patent No.: US 11,813,789 B2
(45) Date of Patent: Nov. 14, 2023

(54) 3D PRINTING BEAD CONFIGURATION

(71) Applicant: Mark Saberton, Bonita Springs, FL (US)

(72) Inventor: Mark Saberton, Bonita Springs, FL (US)

( * ) Notice: Subject to any disclaimer, the term of this patent is extended or adjusted under 35 U.S.C. 154(b) by 0 days.

(21) Appl. No.: 17/667,081

(22) Filed: Feb. 8, 2022

(65) Prior Publication Data

US 2022/0193981 A1     Jun. 23, 2022

Related U.S. Application Data

(62) Division of application No. 16/910,556, filed on Jun. 24, 2020, now Pat. No. 11,331,848.

(60) Provisional application No. 62/940,419, filed on Nov. 26, 2019.

(51) Int. Cl.
*B29C 64/112*     (2017.01)
*B29C 64/343*     (2017.01)
*B33Y 10/00*      (2015.01)

(52) U.S. Cl.
CPC .......... *B29C 64/112* (2017.08); *B29C 64/343* (2017.08); *B29K 2995/0078* (2013.01); *B29K 2995/0094* (2013.01); *B33Y 10/00* (2014.12)

(58) Field of Classification Search
CPC ... B29C 64/112; B29C 64/343; B29C 64/106; B33Y 10/00
See application file for complete search history.

(56) References Cited

U.S. PATENT DOCUMENTS

| 2015/0197060 | A1* | 7/2015 | Carr | B29C 64/393 |
| | | | | 264/40.1 |
| 2018/0297272 | A1* | 10/2018 | Preston | B29C 64/386 |
| 2022/0043430 | A1* | 2/2022 | Iriguchi | B29C 64/393 |

* cited by examiner

*Primary Examiner* — Joseph S Del Sole
*Assistant Examiner* — Mohamed K Ahmed Ali

(57) ABSTRACT

The present invention provides a method for altering the bead profile for using 3D printing to improve the shear strength of a so manufactured product by altering the bead height of adjacent beads or in adjacent layers such that either the height or the centers of the beads between adjacent layers are altered. This is achieved by either height reduction or by flow rates to alter the height or positioning of the beads by altering the bead profiles the shear strength between adjacent layers in the X-Y plane is improved. The present invention is equally applicable to increasing shear strength in the Y-Z plane or the X-Z plane as desired.

4 Claims, 2 Drawing Sheets

3D PRINTING BEAD CONFIGURATION

CROSS REFERENCE TO RELATED APPLICATIONS

This application is a divisional application of U.S. patent application Ser. No. 16/910,556, filed Jun. 24, 2020, which claims the priority benefit of U.S. Provisional Patent Application Ser. No. 62/940,419, filed Nov. 26, 2019, for 3D PRINTING BEAD CONFIGURATION, the disclosures of which are hereby incorporated by reference, including the drawings.

BACKGROUND OF THE INVENTION

1. Field of the Invention

The present invention pertains to additive manufacture or 3D printing. More particularly, the present invention concerns the shear strength of an additive manufactured product. Even more particularly, the present invention concerns the bead profiles for use in 3D printing to improve the shear strength of a so manufactured product.

2. Description of Prior Art

As is known to those skilled in the art to the which the present invention pertains, 3D printed, or additively manufactured products using fused filament fabrication comprise multiple layers of beads which ordinarily lie co-planar in an X-Y plane and are deposited atop one another along a Z axis.

Typically, these beads are issued from an extruder nozzle and deposited side-by-side and atop one another. The traditional bead takes on a standard geometric configuration such as circular, rectilinear, quadrangular and the like. While the adhesion and shear strength of traditional beads lying atop one another is adequate in their respective Z axis, it is the X-Y plane shear strength which suffers in the layer to layer bonding.

Ordinarily, the layer to layer interface does not exhibit as much shear strength as the bead(s) itself/themselves. The weak shear strength between the layers is dependent on the polymer and the surface area where cohesion occurs between the layers.

Also, the shear strength depends on the reinforcing fibers and degree of crosslinking. This is especially true when the bead contains reinforcing materials such as fibers and the like. Thus, there is a need to improve the shear strength at the interface between the layers.

The prior art has somewhat recognized and addressed the bead configuration issue in order to improve its properties. For example, U.S. Pat. No. 5,659,925 teaches a process for adjusting the deposition rate of the beads to provide a predetermined porosity greater than zero in prototype modeling.

U.S. Pat. No. 9,498,919 addresses surface characteristics of 3D manufactured products and seeks to improve their surface smoothness.

In U.S. Patent Publication No. 2019/00094472, there is taught the inspection of different bead profiles and arrangements.

While U.S. Patent Publication No. 2019/0370114 discusses different bead sizes, orientations, sequencing and generation for homogenous materials, it does not address the issues of improving the interlaminar stress weakness.

It is to be appreciated from what has been set forth herein that the prior art does not address the profiling of the beads in order to improve the shear strength in the Z axis at the interface between layers.

It is to this to which the present invention is directed.

DESCRIPTION OF THE PREFERRED EMBODIMENT

Figure 1:
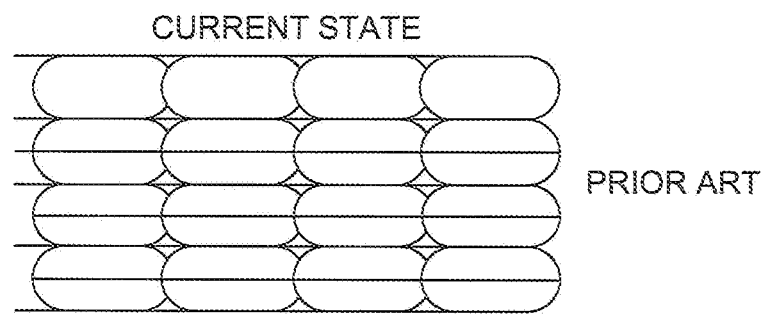
FIG. 1 is a plan view of the current state of bead layering in a 3D manufacturing environment vis-à-vis shear strength.

At the outset and with reference to FIG. 1, as noted above and as is known to the skilled artisan, the layer to layer bonding of co-planar or parallel beads within the X-Y plane of a 3D printed or additive manufactured article, typically, does not exhibit as much shear strength as the bead, itself. This is particularly true when the bead contains reinforcing material such as fibers, etc.

Typically, these so-printed parts generally exhibit only about 20% of the shear strength in the X-Y plane as compared to the cross-planes when including a fiber reinforcement. The shear strength is slightly elevated without the fiber reinforcement.

In accordance herewith, it has been found that by staggering the bead size, the shear strength of the printed part in the X-Y plane can be greatly increased with or without the fiber reinforcement.

Thus, in accordance with the present invention, the shear strength of a 3D printed part along the X-Y plane is increased by staggering the size or height of the bead along the Z axis. Although the height variant, itself, can vary, preferably, by alternating half height beads at the start of where the strength is needed, ordinarily, at the base of the print, the shear strength is increased.

Referring to the drawing, and, particularly, FIGS. 2-5, an illustrative 3D printed part, generally denoted at 10, has a plurality of bottom layers 12, generally, denoted at 20, intermediate layers 14, 16, 18, 19 and a topmost or upper layer 21. The layers comprise a plurality of beads 22, 24, 26, 28, etc.

Figure 2:
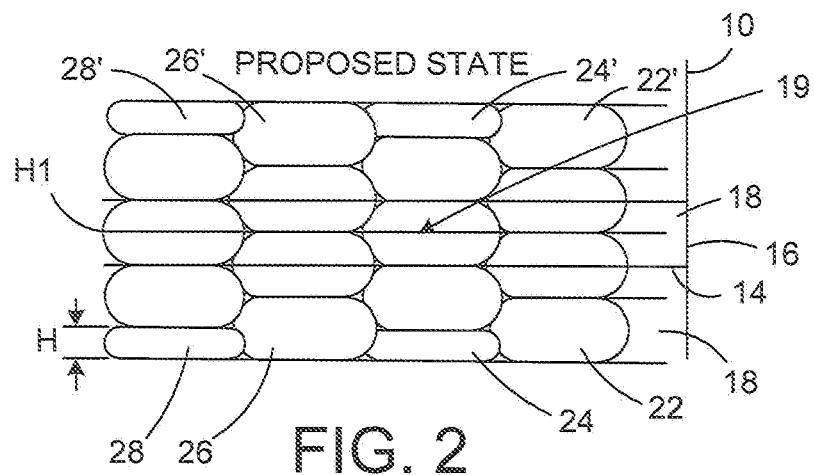
FIG. 2 is a plan view of a bead configuration according to the present invention.
Figure 3:
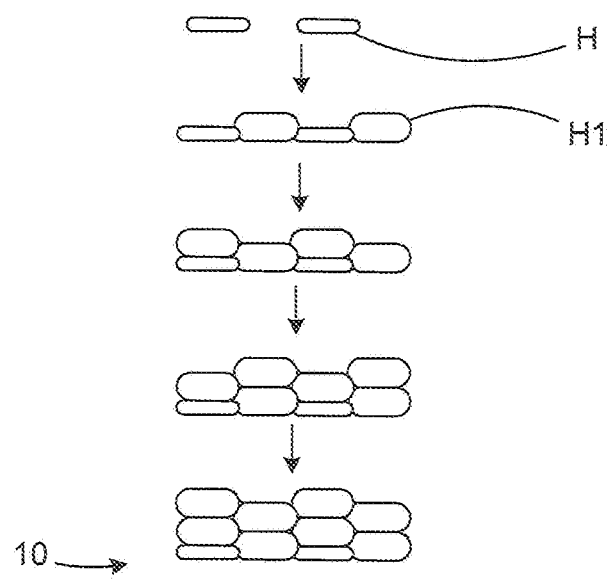
FIG. 3 is a flow chart depicting the printing sequence of beads in accordance with the present invention.

As shown in FIGS. 2 and 3, the lowermost layer 20 is provided with a series of alternating beads 24, 28 having a height H. The height H is equal to about one-half the height H1 of the adjacent and overlying beads. Similarly, the uppermost layer 21 has a series of alternating beads 24', 28'. The beads 24', 28' have a height H1, as well. Adjacent to the H height beads in both the lowermost and uppermost layers are beads 22, 26, 22', and 26'. These beads have a height H1. Similarly, the beads in the intermediate layers have a height of H1.

As shown in FIGS. 2 and 3, each bead in each layer is oval and the beads in the intermediate layers are uniform in height.

In achieving this configuration, suitable means such as a slicer (not shown) which may be controlled through suitable means, such as software, is used to control the height. Alternatively, a manual slicer (not shown) may be used.

Figure 4:
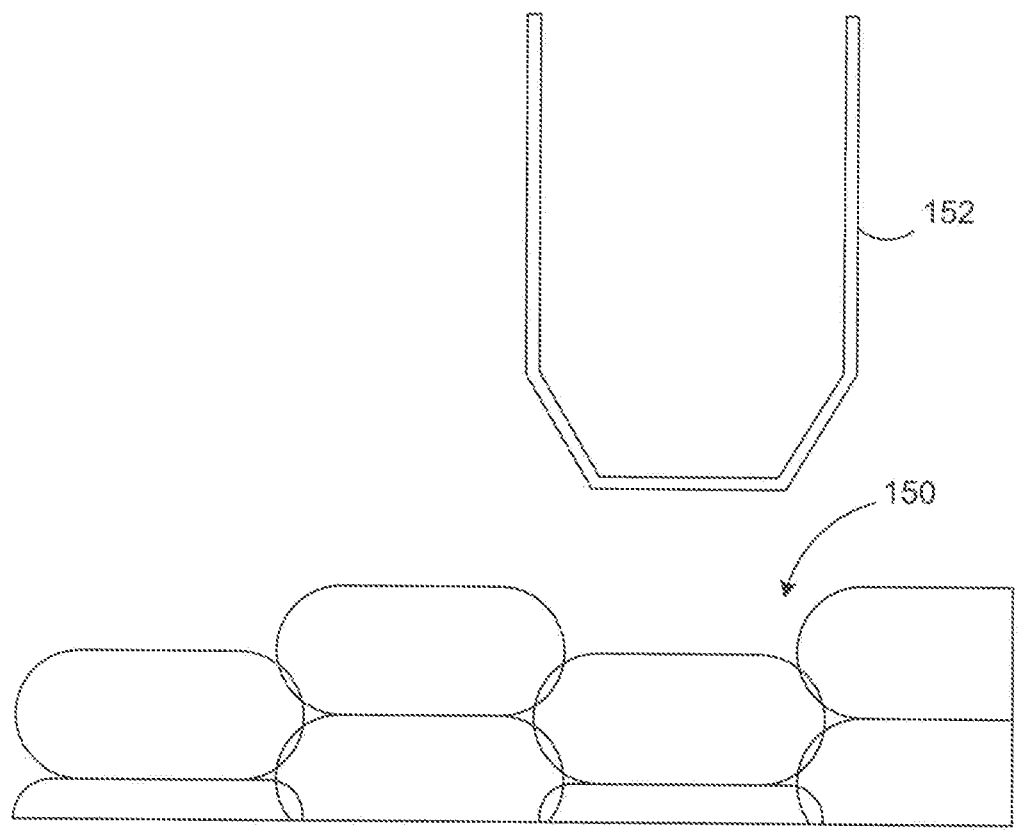
FIG. 4 illustrates a printing technique for creating the present bead configuration.

Referring to FIG. 4 for the lowering of the beads to height H is achieved by reducing the flow rate by one-half or increasing in the feed rate to two times that of the adjacent beads to provide the lower height profile.

Alternatively, a two-stage nozzle can also be used to facilitate this type of a bead profile.

As noted above, and as shown in FIG. 2 the present invention anticipates the top layer and bottom layer each having alternating reduced bead heights.

FIG. 3 illustrates a typical additive printing path to achieve this configuration.

After depositing alternating beads in the bottom layer full size beads H1 are deposited thereover.

As shown in FIG. 4 as a consequence of using this printing technique a valley 150 is created between spaced apart beads in any one layer. Liquid resin or other material issues from a nozzle 152 such that the resin is deposited in an associated valley which, as shown, is defined by the walls of the adjacent beads. Using this "valley" configuration reduces the porosity of the finished part.

FIG. 3 depicts therein the contemplated result achieved by the practice of the present invention where T indicates the shear plane as a result where F indicates forces of shear stress and T the theoretical result as shown on the current state of manufacturing with all the beads all the same size throughout the product and the beads being co-planar the shear strength is less than 20% of the current material. To practice the present invention, it is believed that the shear plane with the original 20% strength adds an additional 50% more than the parent.

Figure 5:
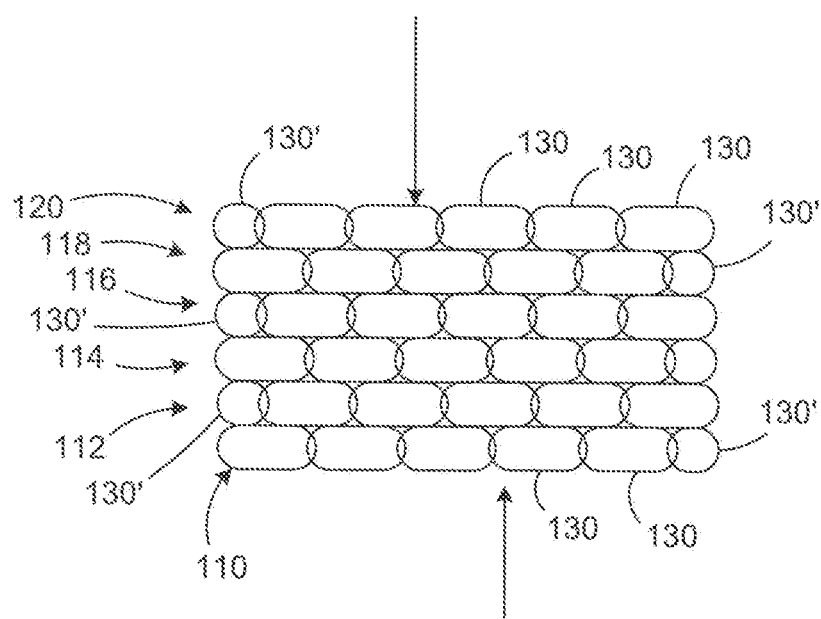
FIG. 5 is a plan view of an alternate Z axis strengthened bead configuration.

As shown in FIG. 5 a plurality of bead layers 110, 112, 114, 116, 118 and 120 each comprises a plurality of beads where the terminal bead is reoriented such that its horizontal axis is substantially normal to that of the remaining beads in the layer. Thus, each bead 130 is oriented to have its width substantially equal at each layer. However, the terminus beads 130 for each alternating layer has a width equal to about one-half of that of the remaining beads in the respective layers. This results in a staggering of the vertical axes of the layers such that only alternating layers lie along the same vertical axis and the alternating beads are offset with respect thereto.

As noted, a two-stage nozzle or changes in the nozzle velocity and/or changes in the flow rate can be used to create the bead profiles contemplated for use herein.

The present invention is applicable to any 3D printed material, including, for example, resins, such as ABS, ASA, PLA, PETG, polypropylene, TPU, nylon, polycarbonate, PSU, PPSU, PESU, PEI, PEKK, PEEK, as well as metals, ceramics, sand or cement. Useful fillers include, for example, carbon fiber, glass fiber, wood fiber, various metals. The filler can comprise short fibers, as well as, long fibers, whether milled or not.

In adopting the present manufacturing method, it should be noted that typically, the process is applicable only to the internal structure of the part, i.e., it is adopted for deposition after the base layer and below the top layer. As a consequence, the present method does not permit a smooth surface because of the discontinuities or disruptions in the bead height. Similarly, the present invention alters the porosity of the finished product. It is to be noted that if an increase in the shear strength is needed in the X-Z plane or the Y-Z plane, the staggering is equally applicable thereto, but, in lieu of the height adjustment, the width of the bead is controlled.

The present invention does increase the shear strength where it is deployed, be it either in the X-Y plane; X-Z plane, or the Y-Z plane.

In practicing the present method, conventional 3D printing temperatures and pressures are adopted and utilized. The extrudate is amongst the resins identified hereinabove, as well as the other materials which are issued through the extruder head onto the base platen upon which the first layer is deposited.

The temperatures and pressures which are adopted and utilized are those associated with the ordinary extrusion of the materials which are well known to the skilled artisan.

Having, thus, described the invention, what is claimed is: The invention claimed is:

1. A method of additive manufacturing for improving a shear strength of an object along a vertical axis, the improvement comprising:
    (a) depositing at least three bead layers along a vertical axis of an object to be printed, the layers including (i) a bottommost layer comprising a plurality of adjacent bead layers deposited in the X-Y plane, each bead in the layer being oval in shape; (ii) at least one intermediate layer comprising a plurality of bead layers deposited in the X-Y plane; each bead in each of the plurality of intermediate bead layers being oval in shape, each bead of the intermediate bead layer being of uniform height; (iii) an uppermost layer comprising a plurality of adjacent bead layers deposited in the X-Y plane, each bead in the uppermost layer being oval in shape, and
    (b) wherein by lowering the vertical axis of the bead height of a bead disposed between a bead on either side thereof in the uppermost and lowermost layers by reducing a flow rate of a material to be printed by one-half of the flow rate for manufacturing the bead height of the beads adjacent thereto to create an object, whereby the shear strength of the object is improved.

2. A method of additive manufacturing for improving a shear strength of an object in a vertical axis, the improvement comprising:
    a) depositing at least three bead layers along a vertical axis, the layers including (i) a bottommost layer comprising a plurality of adjacent bead layers deposited in the X-Y plane, each head in the layer being oval in shape; (ii) at least one intermediate layer comprising a plurality of bead layers deposited in the X-Y plane; each bead in each of the plurality of intermediate bead layers being oval in shape; each bead of the intermediate bead layer being of uniform height; (iii) an uppermost layer comprising a plurality of adjacent bead layers deposited in the X-Y plane, each bead in the uppermost layer being oval in shape, and
    (b) wherein by lowering the vertical axis of the bead height of a bead layer positioned between bead layers on either side thereof, by doubling a material feed rate for such so-positioned bead layers of that of the flow rate of the bead layers on either side thereof in the uppermost and lowermost layers, whereby the shear strength of the object is improved.

3. A method for improving a shear strength of a three dimensional additive manufactured product, comprising:
    (a) depositing at least three bead layers along a vertical axis, the layers including (i) a bottommost layer comprising a plurality of adjacent bead layers deposited in the X-Y plane, each bead in the layer being oval in shape; (ii) at least one intermediate layer comprising a plurality of bead layers deposited in the X-Y plane; each bead in, each of the plurality of intermediate bead layers being oval in shape, each of the beads in each intermediate bead layer being of uniform height; (iii) an uppermost layer comprising a plurality of adjacent bead layers deposited in the X-Y plane, each bead in the uppermost layer being oval in shape, and
wherein the bottommost and uppermost layers are each deposited along the X-axis or Y-axis in alternating bead height layers of a first height and a second height.

4. The method of claim 3, wherein at least a terminal bead in the bottommost and uppermost layers are of the first height which is less than the second height.

\* \* \* \* \*